United States Patent [19]

Cooper

[11] Patent Number: 4,756,570
[45] Date of Patent: Jul. 12, 1988

[54] SUNSHADE SUPPORT ASSEMBLY

[75] Inventor: Norman F. Cooper, Mt. Clemens, Mich.

[73] Assignee: General Motors Corporation, Detroit, Mich.

[21] Appl. No.: 52,479

[22] Filed: May 21, 1987

[51] Int. Cl.⁴ ............................................. B60J 3/02
[52] U.S. Cl. ............................ 296/97 K; 248/289.1
[58] Field of Search .................. 296/97 H, 97 K; 248/289.1

[56] References Cited

U.S. PATENT DOCUMENTS

| 3,334,853 | 8/1967 | Noll | 248/289 |
| 3,334,854 | 8/1967 | Nesbitt | 248/289 |
| 4,178,035 | 12/1979 | Cziptschirsch | 296/97 |
| 4,352,518 | 10/1982 | Prince et al. | 296/97 |
| 4,569,552 | 2/1986 | Marks | 296/97 K |
| 4,696,510 | 9/1987 | Zwirner | 296/97 K |

Primary Examiner—Robert R. Song
Attorney, Agent, or Firm—Herbert Furman

[57] ABSTRACT

A sunshade support assembly includes a molded plastic support having an extension provided with a tapered external surface and a cylindrical bore. A series of slots in the extension provide radially displaceable clamping portions. A sleeve having a tapered internal surface is axially force fitted over the tapered exterior surface of the extension to set the frictional clamping force between the extensions and a leg of a sunshade support arm rotatably received in the cylindrical bore of the extension. The support arm is L-shaped and has a molded plastic elbow bearing against the support.

3 Claims, 1 Drawing Sheet

U.S. Patent       Jul. 12, 1988       4,756,570
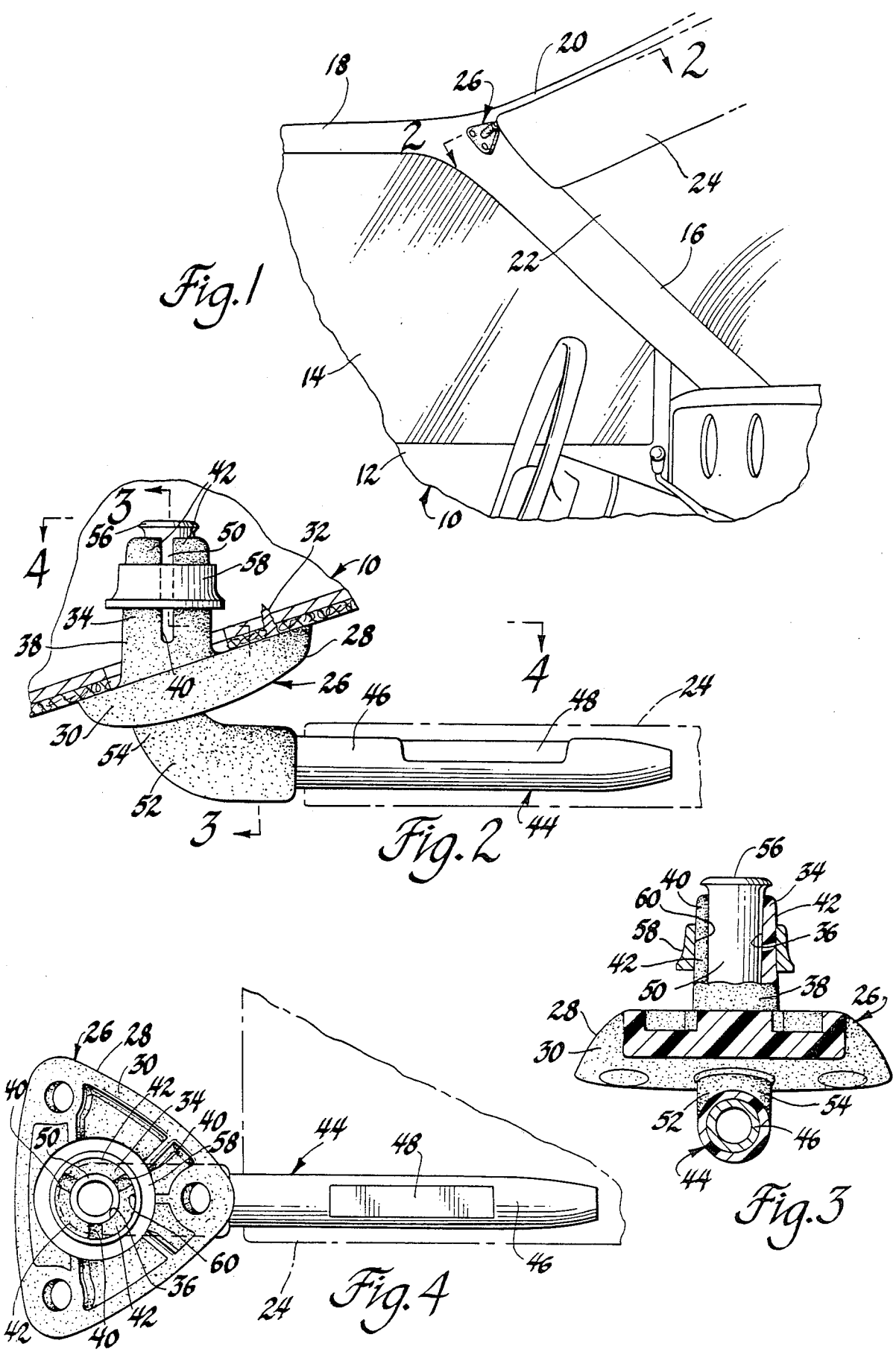

SUNSHADE SUPPORT ASSEMBLY

This invention relates generally to sunshade support assemblies and more particularly to a sunshade support assembly for vehicles having an improved pivot arrangement.

Sunshade support assemblies are well known in the prior art. Generally such support assemblies include a support which is mounted on the vehicle structure, a support arm for supporting the sunshade, and a pivot arrangement for pivotally mounting the support arm to the support and frictionally holding the arm in various adjusted positions.

U.S. Pat. Nos. 3,334,853 Noll, issued Aug. 8, 1967, and 3,334,854 Nesbitt, issued Aug. 8, 1967, show a pivot arrangement which includes tapered internesting members which mount the support arm and are frictionally engageable with the support under a compression spring bias to hold the members in various adjusted positions. U.S. Pat. No. 4,178,035 Cziptschirsch, issued Dec. 11, 1979, shows a support arm frictionally interfitted into a plastic bushing which is mounted on the vehicle structure. U.S. Pat. No. 4,352,518 Prince et al, issued Oct. 5, 1982, shows a plastic bushing which is initially molded to the support arm and is thereafter fixed to the support so that the support arm must move frictionally relative to the bushing.

In all of the foregoing structures, the adjustment frictional holding the support arm in various adjusted positions varies due to manufacturing tolerances or wear over time.

In the sunshade support assembly of this invention, the pivot arrangement provides a constant frictional holding force between the support and the support arm at all adjusted positions of the support arm about both horizontal and vertical axes.

In the preferred embodiment of the invention, a molded plastic support has a hollow extension provided with a cylindrical bore for pivotally receiving one leg of an L-shaped support arm. The extension is slotted to provide radially displaceable clamping portions. The exterior surface of the extension is tapered and a sleeve having a tapered internal surface is force fitted over the extension to displace the clamping portions against the one leg of the support arm with a predetermined frictional force. The position of the sleeve on the extension sets the frictional clamping force between the clamping portions and the one leg of the support arm. The position of the sleeve can be adjusted, but normally remains fixed throughout the life of the vehicle once set during initial assembly. Further, in order to vertically locate the one leg of the support arm relative to the extension, an elbow of plastic material is molded thereto. This limits the axial insertion of the one leg of the support arm within the extension as well as providing plastic bearing surfaces between the support arm and the extension.

A primary feature of this invention is that it provides a sunshade support assembly having an improved pivot arrangement wherein a molded plastic support has radially displaceable clamping portions which are frictionally clamped against a leg of a support arm by a sleeve fitting axially over the clamping portions. Another feature is that the clamping portions are provided by a slotted hollow extension of the support which receives the leg of the support arm. A further feature is that the extension has a tapered exterior surface which interfits with a tapered internal surface of the sleeve to set the frictional clamping force of the clamping portions against the leg of the support arm. Yet another feature is that the support arm is of generally L-shape and includes a molded plastic sleeve at the elbow thereof which bears against the extension so as to provide interengaging plastic bearing surfaces between the support arm and the support.

These and other features will be readily apparent from the following specification and drawings wherein:

FIG. 1 is a partially perspective view of the interior of a vehicle having a sunshade supported therein by a sunshade support assembly including a pivot arrangement according to this invention.

FIG. 2 is an enlarged view taken generally along line 2—2 of FIG. 1.

FIG. 3 is a sectional view taken along line 3—3 of FIG. 2, and

FIG. 4 is a view taken along line 4—4 of FIG. 2.

Referring now to the drawings, a vehicle designated generally 10 includes a left hand or driver's door 12 having a vertically adjustable driver's door window 14. The door opening for the door 12 includes a windshield or A pillar structure 16 and a roof pillar structure 18. These are joined to a windshield header structure 20. A windshield 22 is framed by the pillar structures 16 and 20, a right hand A pillar structure, not shown, corresponding to the pillar structure 16 and a cowl structure, not shown. The foregoing structures are conventional in current and past production vehicles and form no part of this invention.

A sunshade or visor 24 is mounted on the vehicle 10 at the juncture of the pillar structures 16, 18 and 20 by a sunshade support assembly 26 according to this invention. The assembly 26 supports the visor 24 for adjustable movement about horizontal and vertical axes.

Referring now to FIGS. 2 through 4, the assembly 26 includes a support 28 of molded plastic material having a body portion 30 of generally triangular shape which bears against the trim covered juncture of the pillar structures 16, 18 and 20 and is secured thereby by conventional sheet metal screws 32 extending through apertures thereof as shown in FIG. 2. The support 28 includes an integral extension 34 having an internal cylindrical bore 36 and a slightly tapered exterior surface 38. Three equidistantly spaced slots 40 extend partially axially through the extension 34 from the upper end thereof to divide the extension into three radially displaceable clamping portions 42.

A sunshade support arm 44 is of generally L-shape and includes a longer leg 46 having a flat 48 for rotational securement to the sunshade 24 and a shorter leg 50 which extends through the bore 36 of the extension 34. The support rod 44 is formed from tubing and an elbow 52 of plastic material is molded thereto. The vertical leg 54 of the elbow seats against the outer surface of the body portion 30 around the lower end of extension 34, as shown in FIG. 3, to provide interengaging plastic bearing surfaces between the support arm 44 and the body portion 30 and to also vertically locate leg 50 relative to extension 34. The free end of the leg 50 is partially headed over at 56 as shown in FIGS. 2 and 3 after assembly.

A metal sleeve 58 has an internal surface 60 which is tapered generally the same as the external surface 38 of the extension 34. The sleeve 58 is axially force fitted over the extension to displace the clamping portions 42 of the extension against the leg 50 of the support arm 44 and provide a frictional clamping force holding this leg in any adjusted position about the vertical axis of movement. By setting the position of the sleeve relative to the exterior surface of the clamping portions at initial assembly, the frictional clamping force between the extension 34 and the support arm 44 can be set and should remain constant for the life of the vehicle. If this clamping force changes, it can easily be reset to the desired value by adjusting the axial position of the sleeve 58 relative to the clamping portions 42.

Thus this invention provides an improved sunshade support assembly.

The embodiments of the invention in which an exclusive property or privilege is claimed are defined as follows:

1. A sunshade support assembly, comprising, in combination,
   a support having an elongated extension provided with a generally cylindrical bore therethrough and an exterior surface tapered from one end thereof to the other end thereof, said extension including a number of slots extending from the one end thereof partially toward the other end thereof to provide the extension with a number of radially displaceable clamping portions,
   a generally L-shaped sunshade support arm including a pair of legs and an elbow portion, one of the legs of the support arm being generally cylindrical and extending through the cylindrical bore of the extension from the other end thereof, cooperating engageable means on the arm and on the other end of the extension to axially locate the one leg of the arm within the cylindrical bore of the extension,
   a sleeve member having an internal surface tapered complementary to the tapered exterior surface of the extension of the support, the sleeve member being force fitted axially along the exterior surface of the radially displaceable clamping portions of the extension to a position wherein such portions radially clamp the one leg of the support arm with a predetermined frictional force, the one leg of the support arm being normally non-rotatable relative to the extension unless a torque sufficient to overcome the predetermined frictional force is applied to the support arm.

2. A sunshade support assembly comprising, in combination,
   a support having an elongated hollow extension provided with a tapered exterior surface, said extension being slotted to provide a number of radially displaceable clamping portions,
   a sunshade support arm including a leg rotatably received in the extension,
   a sleeve having an internal surface tapered complementary to the tapered exterior surface of the extension of the support, the sleeve being force fitted axially along the exterior surface of the radially displaceable clamping portions of the extension to a position wherein such portions radially clamp the leg of the support arm with a predetermined frictional force, the leg of the support arm being normally non-rotatable relative to the extension unless a torque sufficient to overcome the predetermined frictional force is applied to the support arm.

3. A sunshade support assembly comprising, in combination,
   a support having an elongated extension provided with a generally cylindrical bore therethrough and a tapered exterior surface, said extension including a number of circumferentially spaced slots to divide the extension into radially displaceable clamping portions,
   a sunshade support arm including a generally cylindrical leg rotatably received in the cylindrical bore of the extension, cooperating engageable means on the leg and on the extension axially locating the leg of the support arm relative to the extension,
   a sleeve having an internal surface tapered complementary to the tapered exterior surface of the extension of the support, the sleeve being axially force fitted along the exterior surface of the clamping portions of the extension to a position wherein such portions radially clamp the leg of the support arm with a predetermined frictional force, the leg of the support arm being normally non-rotatable relative to the extension unless a torque sufficient to overcome the predetermined frictional force is applied to the support arm.

* * * * *